Aug. 29, 1944.    L. S. TREESE ET AL    2,357,035
VARIABLE SPEED DRIVE
Filed Oct. 24, 1942

L. S. Treese
E. G. Schubert
INVENTORS
BY Edwin C. McRae
R. G. Harris
Attorneys

Patented Aug. 29, 1944

2,357,035

UNITED STATES PATENT OFFICE 2,357,035

VARIABLE SPEED DRIVE

Lee S. Treese, Dearborn, and Elmer G. Schubert, Detroit, Mich., assignors to Ford Motor Company, Dearborn, Mich., a corporation of Delaware Application October 24, 1942, Serial No. 463,162

1 Claim. (Cl. 74—198)

This invention relates to mechanical movements; and, more particularly, to a variable speed drive employing the disc and ball principle.

The application of this invention is found particularly in precision variable speed drives of the type used to obtain a very fine adjustment in such instruments as antiaircraft fire control directors and the like.

The basic principle, of course, of using a rotating disc and a roller or ball at various positions of radial displacement thereon to obtain speed variation is old in the art. The minute adjustments possible with this type of variable speed drive have found particular application in precision work and the elements have been developed to a high degree of accuracy necessary in this work. However, to obtain this accuracy it has heretofore been necessary to take extreme pains to obtain proper alignment and engagement of the components; and, even then, objectionable inaccuracies in operation would occur.

The advantage of this invention is that it employs a construction which is relatively simple to produce within the limits of required accuracy and which assures proper alignment and operation of the device throughout its various stages.

Another advantage of this invention is that it provides a small carriage which may be readily made from available commercial elements, rather than the specially designed components heretofore required, and which may be more readily assembled. Yet another advantage of this invention is that the construction used provides for the proper alignment and maintenance of the components at all times and obtains this by the inherent properties of the components used rather than—as in previous constructions—by the use of superlatively exact and hence difficult-to-machine elements.

In the prior art, these variable speed devices comprised a rotating disc, a ball carrier arranged to reciprocate across the face of the disc, a plurality of balls rotatably supported in the ball carrier and a drum arranged in the direction of reciprocation on the opposite side of the ball carrier from the disc. One of the balls in the carrier made rolling contact with the disc and was rotated thereby. Another ball in the carrier made rolling contact with the first ball and was also rotated thereby and transmitted this rotation to the drum with which it was in rolling contact. By reciprocating the ball carrier, the first-named ball would make contact with the disc at different radial positions and hence the velocity imparted would vary as the radius. This velocity would be imparted to the other ball and thence to the drum. Accordingly, by changing the position of reciprocation, a closely graduated speed variation could be obtained between the disc and drum and utilized for any purpose desired. The difficulty at once is apparent that as the balls are rotating in opposite directions, any change in their axial alignment would necessarily create irregular variation in the velocity ratio between the disc and drum. To maintain the balls in the selected axial alignment, it was customary to provide a pair of roller bearings on opposite sides of each ball, arranged in planes normal to the common axis of the balls. It is apparent that these bearings must be precisely the same size and exactly aligned to maintain the balls themselves in the desired position. However, as the carrier reciprocates, the motion imparted to the balls is not purely tangential to the rotational direction of the disc but a vector component resulting from the movement of the carriage across the disc as well. It thus follows that the balls do not rotate precisely in the same sense throughout and there is a tendency for them, if there is even the slightest inaccuracy in the placement of the rollers to fall into misalignment, particularly as the center of the disc is approached. While this can theoretically be avoided by scrupulous accuracy in the construction of the carriage, such accuracy is difficult to obtain and, at best, is problematical.

An advantage of this construction is that the necessity for such close tolerance is avoided and the operation of the device is improved, even though commercially available components are used.

With these and other objects in view, the invention consists of the arrangement, construction and combination of the various parts of the improved device, as described in the specification, claimed in the claim and illustrated in the accompanying drawing, in which:

Figure 1:
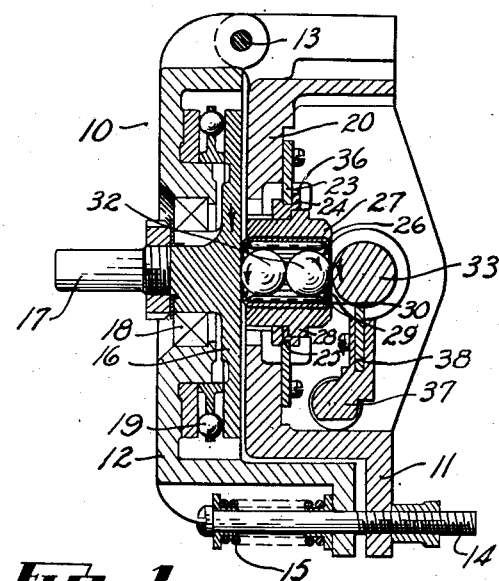
Figure 1 is a section through the device taken on the line 1—1 of Figure 2.
Figure 2:
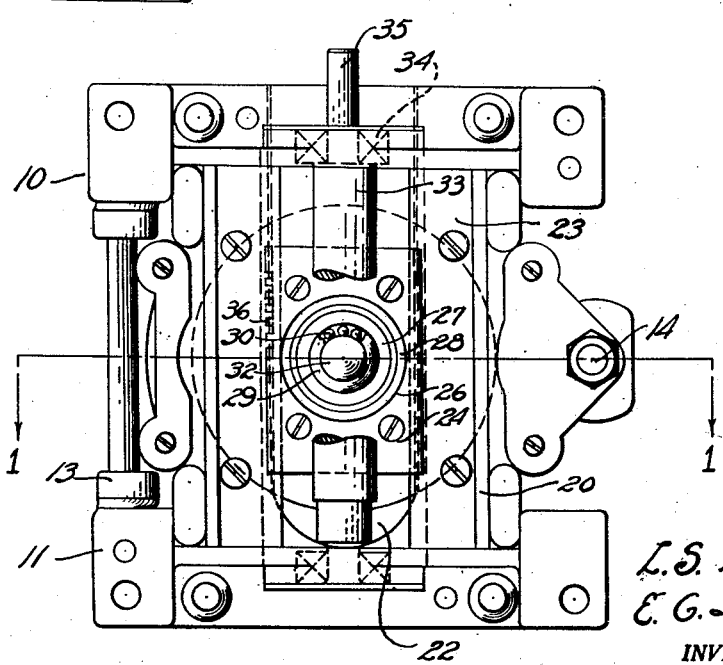
Figure 2 is a rear elevation of the device, portions thereof being broken away to show the construction in some detail.

Referring to Figure 1, reference character 10 indicates generally the variable speed drive which has a housing 11 to which is hinged at 13 the cover 12. The cover 12 is adjustably and resiliently secured to the opposite side of the housing 11 by means of a bolt 14 and a spring 15. The disc 16, having a shaft 17, is journaled in the cover 12 by the bearings 18 and is attached to one drive element which is not shown. The disc 16 is mounted on roller bearings 19 adjacent its periphery to insure its rotation in the selected plane.

The housing 11 has a transverse wall 20 provided with slot 22 adjacent which are mounted the slideways 23. The ball carriage 24 is slidably mounted in these ways and has a central aperture 25 in which is secured the ball housing 26. This consists essentially of a collar 27 and a flange 28 by means of which it is secured to the ball carriage. The needle bearing cage 29, enclosing a number of needle bearings 30, is pressed into the collar 27 and the two balls 32 are freely supported therein by the needle bearings. The drum 33 is arranged transversely in the direction of the slot 22 and journaled in the housing 11 by the bearings 34, making a contact with one of the balls 32 which makes contact with the other ball 32 which in turn bears against the disc 16. A drive attachment 35 is formed on the drum 33 for attachment to a driven element which is not shown. A rack 36 is formed on one side of the ball carriage 24 and engages a pinion, which is not shown, by means of which the carriage may be reciprocated into the desired radial relationship with the disc face. An oiling device 37 is provided in the housing 11 and has a flexible blade 38 which wipes the drum 33.

The operation of the device is believed to be clear, since the cover 12 is resiliently adjusted with respect to the housing 11 by means of a bolt 14 and spring 15 to insure proper frictional contact between the disc, the two balls and the drum. Thereafter, as the disc 16 is rotated, the carriage may be moved to bring the point of contact between the ball contained therein into different radial positions with respect to the disc. Corresponding rotational velocity is then imparted to the balls, which in turn is transmitted to the drum 33, and the desired ratio of velocity between the disc shaft 17 and the drum shaft 35 is obtained.

The advantages of this construction should be at once apparent. The needle bearings, as is well known in the art, function by a combined rolling and sliding action in the cage. As their axes are parallel to the desired axis of the ball throughout and this alignment is maintained automatically, it is apparent that regardless of the direction of rotation of the balls, a linear support is provided, which is not possible when a purely rotative bearing is used. Moreover, since both balls will be in contact with the same needle bearing or bearings at any position of operation, the same condition will apply to each and the axial arrangement strictly maintained.

It thus follows that regardless of the sense of rotation of the balls, the support afforded them is purely linear and the line of support is parallel to the desired axis. Accordingly, there is no opportunity for misalignment with the consequent nonuniform change in ratio over the range of adjustment.

Apart from this operating advantage, there is a further consideration that the needle bearings may be readily made within the necessary limits of accuracy and their mounting within the ball carriage presents no particular difficulty. As is well known, the cage will conform to the inner surface of the collar and it is a relatively simple matter to obtain this concentric and circular within a high degree of accuracy. Moreover, the needle bearings themselves may be made of precisely uniform diameter and of equal size without great difficulty as compared with roller bearings heretofore used. As a practical matter, this is most important since it greatly reduces the time of manufacture and assembly without any consequent sacrifice of accuracy.

Some changes may be made in the arrangement, construction and combination of the various parts of the improved construction without departing from the spirit of the invention and it is the intention to cover by the claim such changes as may reasonably be included within the scope thereof.

The invention claimed is:

In a variable speed device, a housing, a disc rotatably mounted in said housing and having a shaft extending therefrom, a drum rotatably mounted in said housing and spaced from and parallel to said disc, a slot in said housing, a carriage slidably mounted in said slot between said disc and said drum, means to vary the radial position of said carriage with respect to said disc, a ball housing secured to said carriage, a pair of balls in contact in said ball housing, first said ball being in contact with said disc, second said ball being in contact with said drum, the common axis of said balls being substantially parallel at all times with the axis of said disc shaft, a bearing cage secured within said carriage, a plurality of needle bearings disposed in said cage and supporting said balls, the longitudinal axes of said needle bearings being substantially parallel to the axis of said disc shaft, and means to selectively vary the pressure between said disc, balls and drum.

L. S. TREESE.
E. G. SCHUBERT.